Patented July 6, 1937

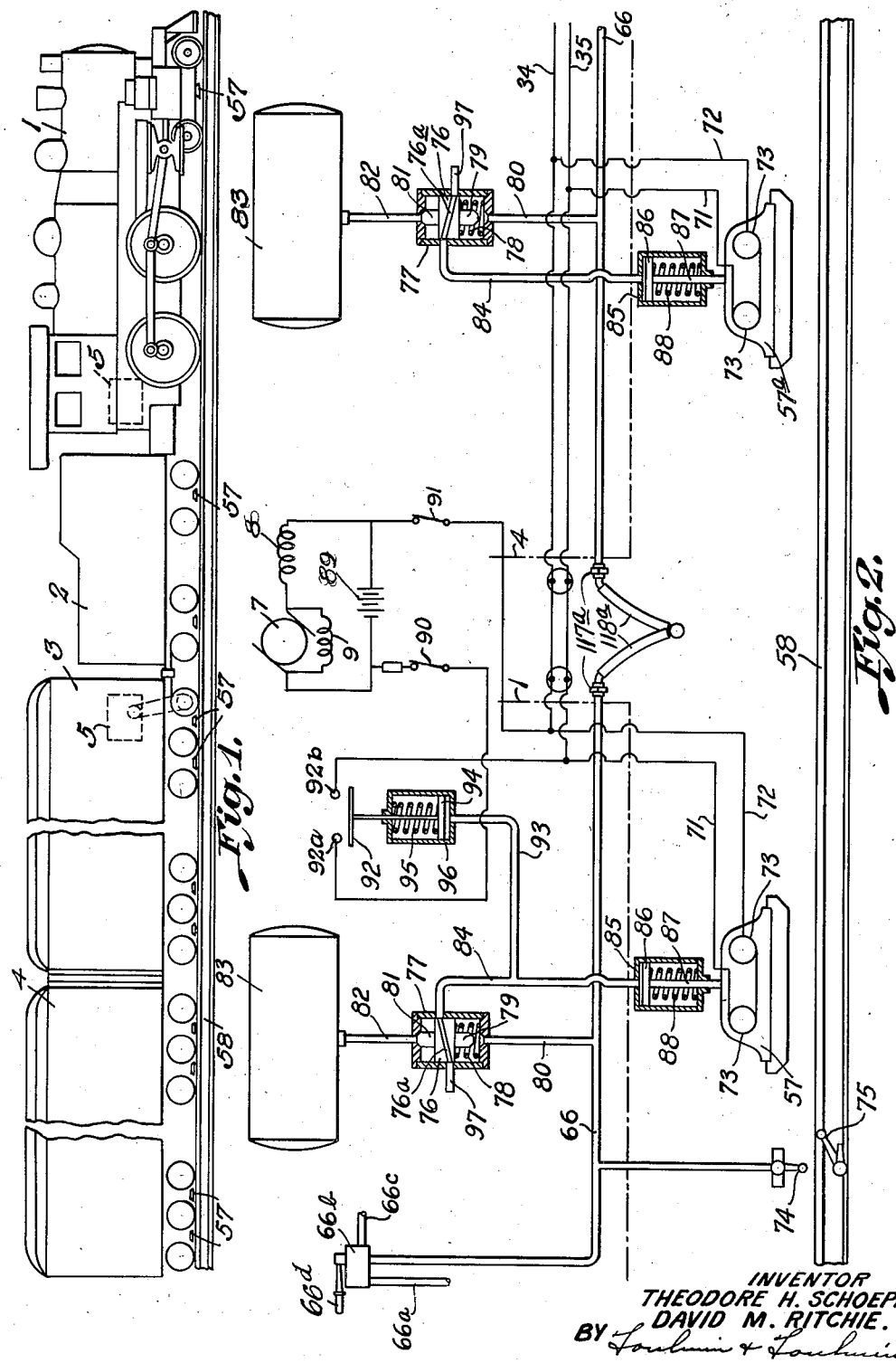

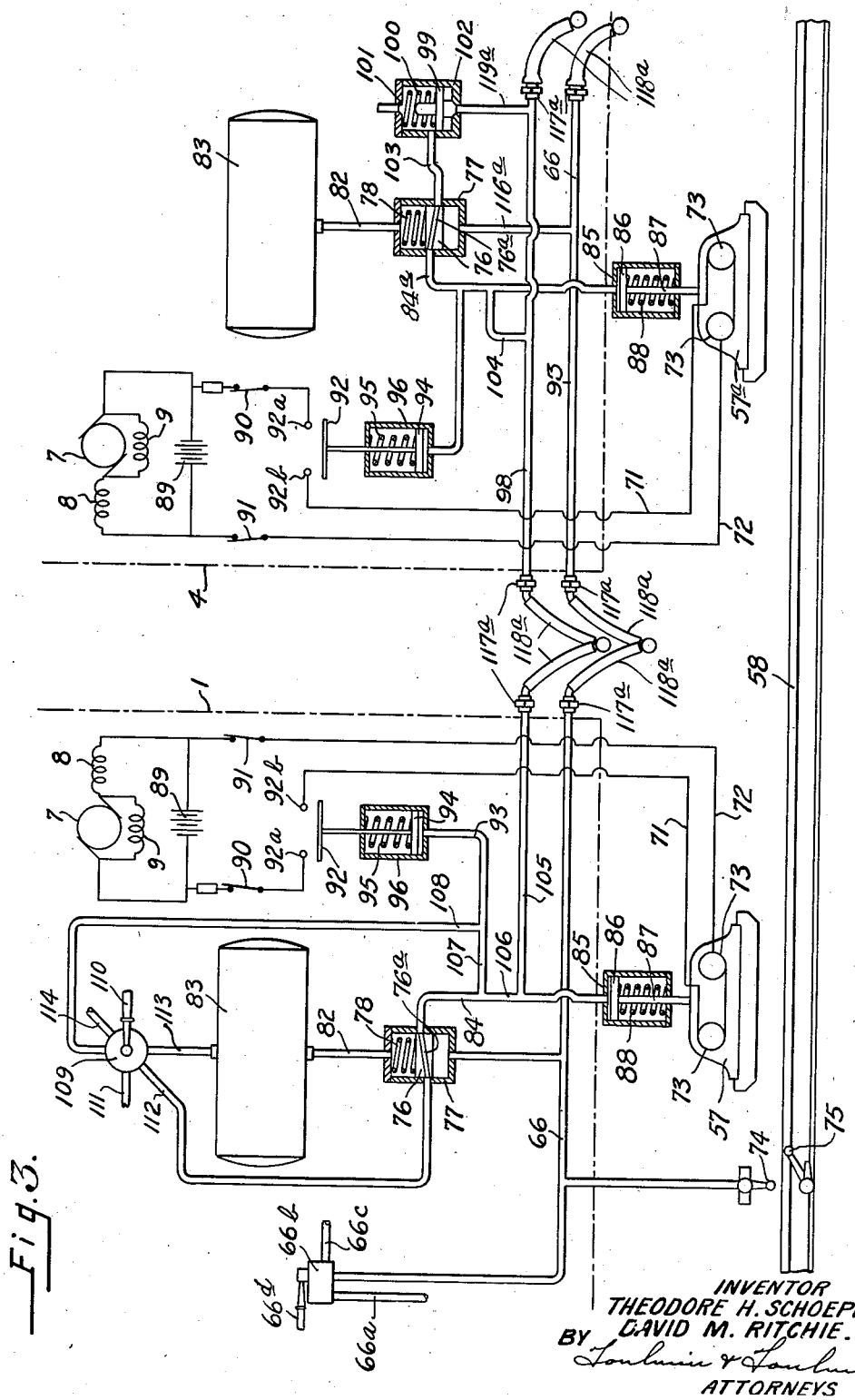

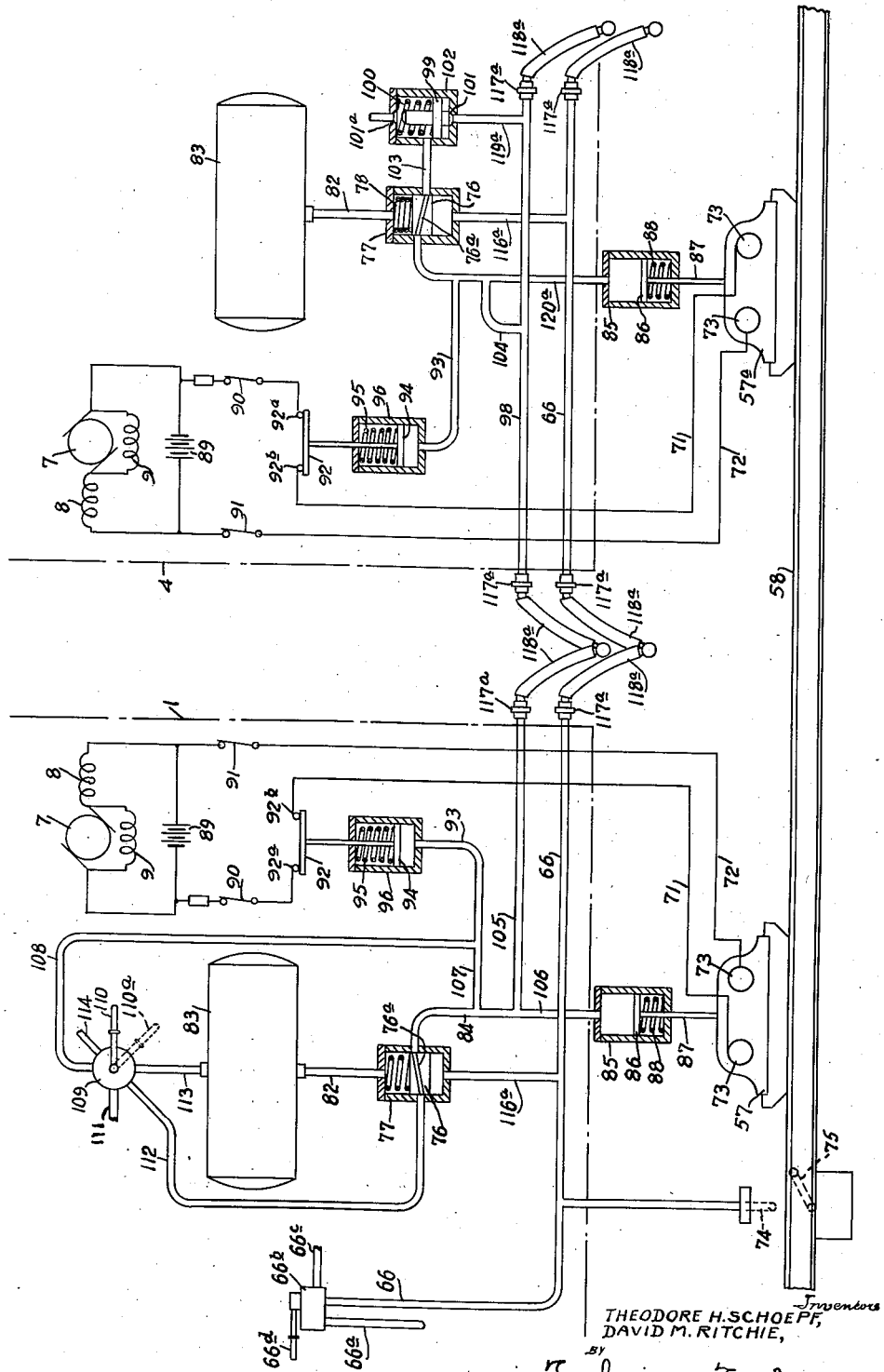

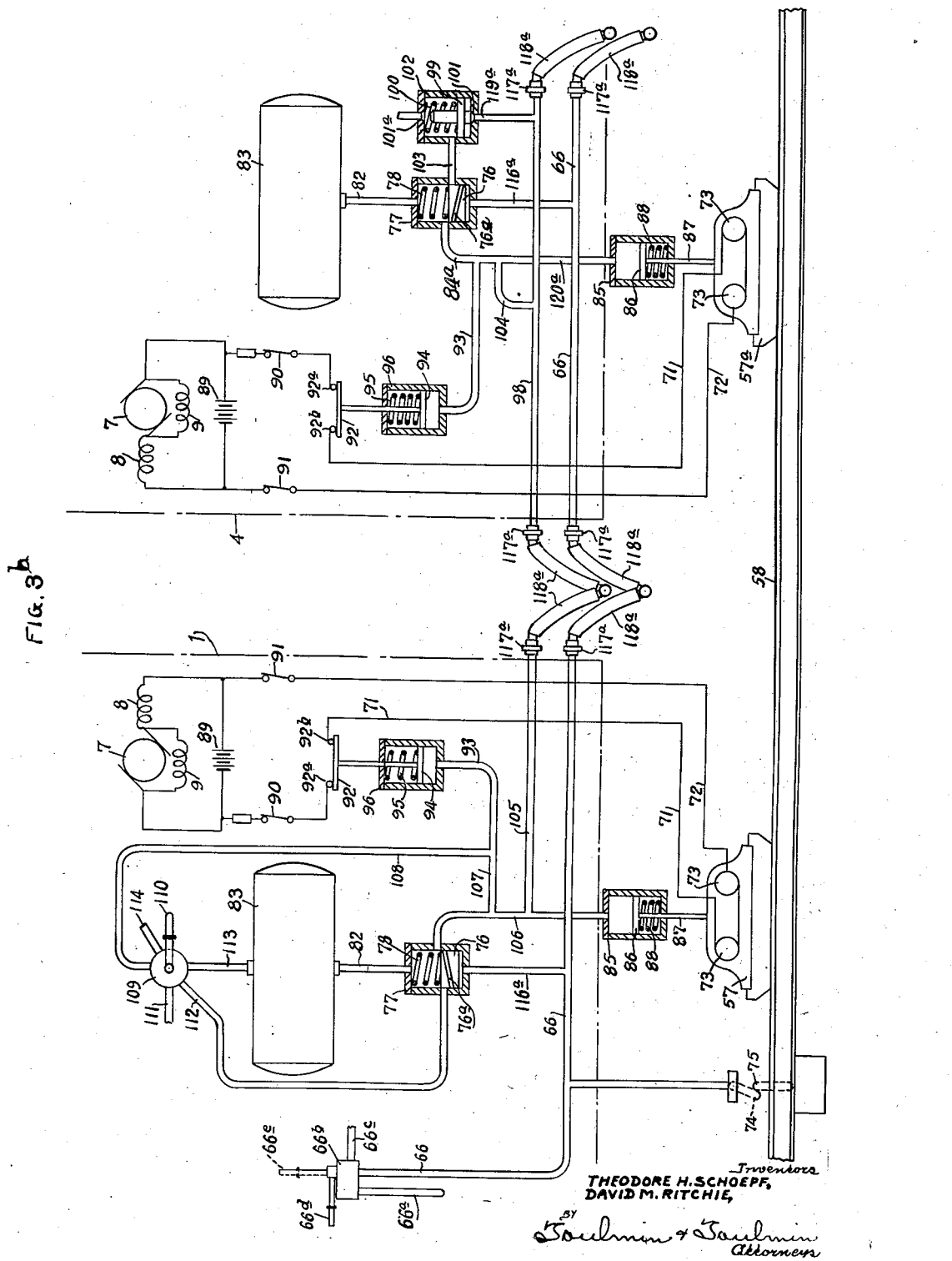

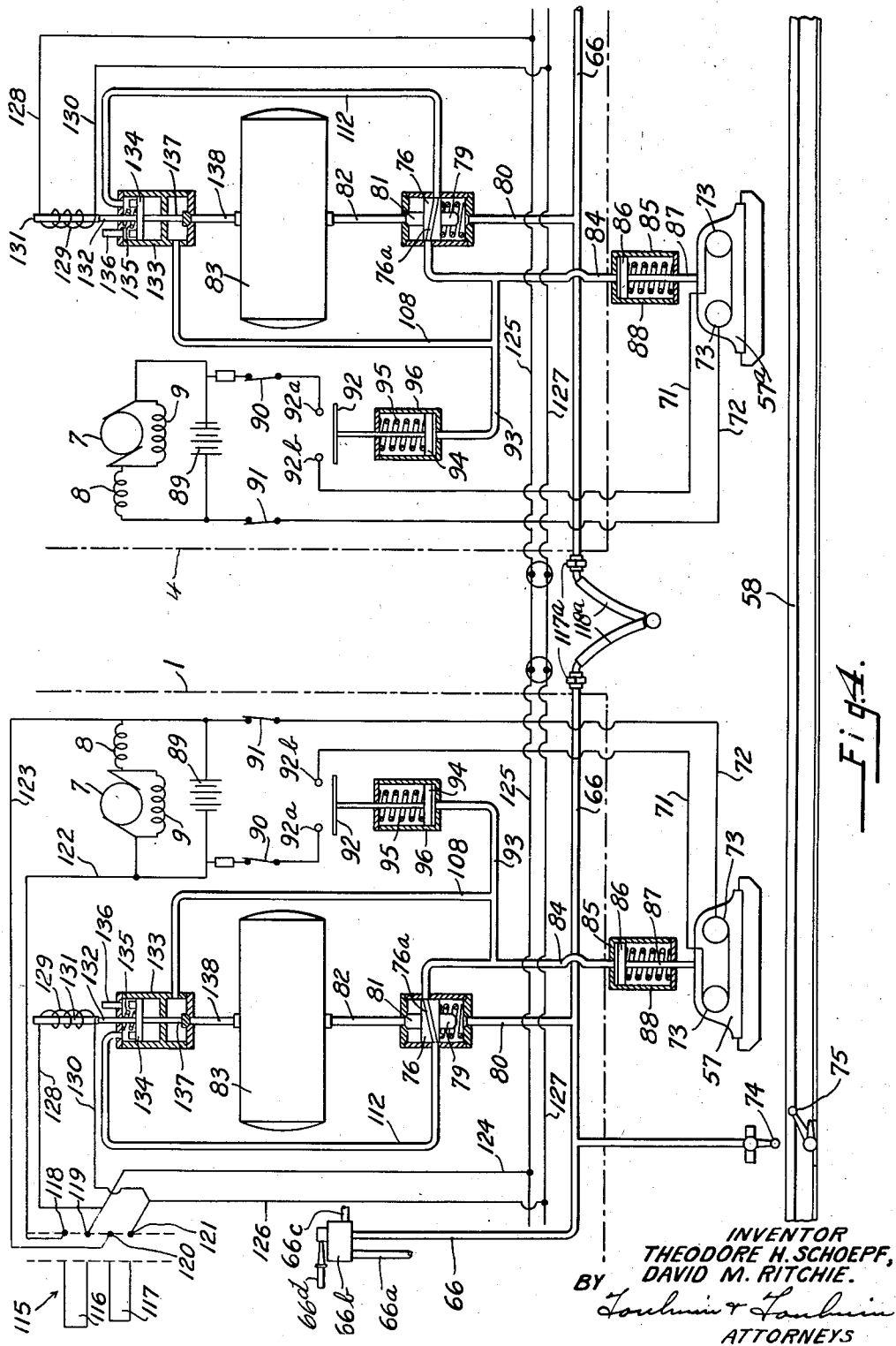

2,086,175

UNITED STATES PATENT OFFICE 2,086,175

MAGNETIC BRAKE

Theodore H. Schoepf and David M. Ritchie, Cincinnati, Ohio, assignors to The Cincinnati Traction Building Company, Cincinnati, Ohio, a corporation of Ohio Application December 3, 1934, Serial No. 755,713

15 Claims. (Cl. 303—3)

Our invention relates to magnetic track brakes.

It is the object of our invention to provide a train brake system employing magnetic track brakes, which system has one or more of the following characteristics:

(1) The track brakes are applied when the train operator makes an emergency application of the usual wheel brakes or their equivalent; or the air brakes are automatically applied in an emergency from the conductor's valves on the train or by external trips such as those set by signals in a signal automatic train stop system.

(2) The track brakes are applied upon the application of the usual wheel air brakes and energized upon being brought within the magnetic zone adjacent the rails.

(3) The train operator has the means of applying the track brakes independently of the orthodox wheel air brakes and of energizing simultaneously the magnetic rail brakes or energizing them when they are brought within the magnetic zone adjacent the rails whence they are drawn to the rails by the magnetization of the magnetic brake shoes.

If these aforesaid mechanisms are provided as a part of the track brake equipment, the cost will be high and added weight considerable. It is our object to use the axle generators and storage batteries customarily used to light the cars, operate fans, and occasionally installed for air conditioning. However, if the track brakes are to be used habitually for all stops, then the axle generators and storage batteries may be necessary for track brakes exclusively.

It is a further object to provide a source of electrical energy from either a storage battery of comparatively low voltage and limited capacity, an axle driven generator or the like, or both, and to locate such source of energy on each of the cars, thereby having the advantage of each car being self-contained, and eliminating any electrical connections between braking systems and between cars.

It is a further object to provide a unitary source of supplementary electrical energy located either in the locomotive, the baggage car, or in one of the cars, and furnishing adequate electrical energy for magnetizing the brakes on a plurality of cars.

It is an object to provide for the application of the track brakes, either to the rail or to a point within the magnetic zone adjacent the rail from a supplementary air source, the application of which is electrically controlled and the magnetization of the brakes being electrically controlled; while permitting selectively at the same time the emergency application of the rail brake by air.

It is an object to provide a common electrical control system for a plurality of magnetic brakes on a plurality of cars, each supplied with its own independent source of electrical energy and means for controlling the application of air to the track brakes for moving them into braking position and for closing the electrical circuits in the event of an emergency.

It is an object to electrically control the application of air for closing electric circuits and applying the magnetic brakes; and for providing in combination therewith means of applying the air automatically or manually in the event of an emergency.

In the drawings:

Figure 1 is a diagrammatic view of a train having magnetic rail brakes and indicating in dotted lines the location of the main electrical power source;

Figure 2 is a diagrammatic view of the air and electrical apparatus for adjacent cars in which there is a single air supply line, a manual control therefor and an emergency control therefor, a single electrical power source on one of the cars and independent supplementary air supplies for each rail braking system on each car;

Figure 3 is a diagrammatic view showing an emergency air line and ordinary straight air line, supplementary air supplies on each car and electrical generating mechanisms for the rail brakes on each car and independently of one another so far as electrical connection is concerned, the parts being in normal relative position with the rail brake shoes elevated above the rails, but with everything ready to energize and apply or position the brakes relative to the rails when occasion requires;

Fig. 3a is a like view to that shown in Fig. 3 as to the parts or features, but with the position of some of the parts as they appear when and after the brake shoes have been magnetized against the rails to create a braking effect in stopping the train;

Fig. 3b is a general view such as shown in Fig. 3a, but the purpose of Figure 3b is to form the basis of the descriptive matter concerning the use or function of the main or emergency air line fed from the air controller 66b.

Figure 4 is a diagrammatic view of the air and electrical brake mechanism of adjacent cars in which there is a single air supply adapted to be opened automatically on emergency and manually at will, independent electrical generating systems and an electrical control system for applying supplementary sources of air for the normal movement of the rail brakes and the closing of the electrical energizing circuits.

Referring to the drawings in detail, it will be understood that, when pneumatic apparatus is referred to, equivalent electrical or hydraulic mechanism may be employed. However, as air brakes are conventional on rail vehicles, we have shown the use of air as the preferred form, but, in many installations, hydraulic applications are equally satisfactory.

Referring to Figure 1, 1 designates a locomotive of any type having a tender 2, a baggage car 3 and one or more cars of other types designated 4. The dotted rectangle in the locomotive and a similar rectangle in the baggage car indicate the general location of the means for supplying electrical energy to the train and the braking system both for the control of the application of the brakes and the energizing of the magnetic brakes. 5 indicates such apparatus.

Referring to the form shown in Figure 2, the operation is as follows: 66 designates an air pressure line supplied with air through the line 66a controlled by the controller 66b having an exhaust 66c. This line is exhausted by tripping the valve 74. This tripping is effected by the signal trip 75 which may be elevated when it is desired to stop the train so that 75 will engage 74 and open the line 66 for emergency purposes. When this occurs, the valve member 76 in the valve casing 77 is depressed against the resistance of the spring 78 so that its projection 79 closes the entrance to the pipe 80 and the projection 81 opens the pipe 82 permitting air to flow from the supplementary air tank 83 through the pipe 82, pipe 84 to the applying valve 85 for applying the magnetic brake 57. This is effected by depressing the piston 86 and its piston rod 87 against the spring 88. The piston rod 87 is connected to the brake 57. The brake itself is energized by current flowing through the lines 71 and 72 which are connected to the coils 73 in said brake 57. These lines are adapted to be supplied with current from an independent generator in each car or in one of the cars, such as the generator 7 which is provided with the series field 8 and the shunt field 9. This generator is adapted to supply current to a storage battery 89. The wires 71 and 72 in Figure 2 are connected respectively with the lines 34 and 35, and the wires 71 and 72 at the left-hand part of Figure 2 are further connected through manually operable switches 90 and 91 with the generator 7. The complete circuit is closed only however, upon the closing of the switch plate 92 by air pressure operating through the pipe 93 against the piston 94 and the resistance of the spring 95 in the switch valve 96. This causes the contact plate 92 to engage the contacts 92a and 92b in the line 71 thus energizing the circuit. It is preferable to have this circuit so arranged that the brake 57 will be brought within the magnetic zone of the rail and then the electrical circuit is closed and the brake is energized so as to be drawn down into final rail engagement position by the energization of the brake shoe and rail.

When the line 66 is manually operated, the same result will take place and the same operation will be performed by the several parts. When the air is allowed to build up in the line 66 the parts assume the position as indicated in Figure 2 and any air in the pipe 84 and pipe 93 can exhaust out through the groove or passageway 76a in the valve 76 and thence through the exhaust port 97.

In Figure 2 it will be noted that we have provided a single electrical generating set in a single car and have electrically connected the cars to one another and also connected them together through the main air line 66 but arranged for independent auxiliary tanks 83 and independent brake operating mechanisms.

Referring to Figure 3 there will be seen a form in which we employ completely independent electrical systems in each vehicle, completely independent pneumatic systems and brake systems with interconnected emergency and straight air lines.

In the arrangement shown in Figure 3, the emergency air line is designated 66 and can be exhausted automatically by the trip valve 74 being operated by the signal trip 75. It also can be controlled by the controller 66b having a handle 66d controlling the air supply 66a and exhaust 66c.

In the event of reducing the pressure in the emergency line 66 suddenly, the valve member 76 is depressed in this instance by the spring 78 acting in conjunction with the air from the tank 83 so that the air can flow through the pipe 82 and pipe 84 to the valve mechanism for applying the rail brake, as heretofore described. The brake is energized as described in connection with Figure 2. Thus, the air line 66 can be maintained at a predetermined emergency pressure or evacuated either manually or automatically to permit of the emergency application of the brakes.

For ordinary operation of the brakes under manual control we provide a straight air line 98. The straight air line 98 runs through the several cars. In the right hand car it serves to close the valve member 99 against the spring 100 to close the exhaust port 101 in the exhaust valve 102.

When this exhaust valve is in its position shown in Figure 3 in the event of an emergency operation, any surplus air can make its exit through the pipe 103 and thence out the exhaust opening 101. The line 98 supplies air through the line 104 thence through the pipe 93 to close the electrical circuit as heretofore described. This same line in the left hand car indicated at 105 supplies air through the section of the pipe designated at 106, the section of the pipe designated 107, through the line 108 by the controller 109 operated by the handle 110 whence it may pass through the exhaust 111. The controller 109 receives exhaust air through the line 112 from the line 84 through the valve 77. The controller 109 may also supply air through the pipe 113 to the tank 83. The straight air line system may receive air through the controller 109 from the air supply pipe 114. By adjusting the controller handle 110, it is therefore possible to perform the several functions of supplying air to the supplementary tanks 83, applying air under manual control to the straight air line for applying the brakes and energizing them independently of the orthodox air brake system, or the air may be exhausted from the emergency air brake system and the emergency air brake system may be independently controlled and applied either manually or automatically with the wheel brakes in the orthodox manner.

The air lines 105, 98 and 66 have angle cocks 117a, and these lines have couplings 118a. The numeral 119a refers to the pipe extending from the pipe line 98 to the exhaust valve 102, and the numeral 120a designates the pipe line from the valve 76 to the valve 85, as in Fig. 3. The numeral 116a refers to the pipe which connects the main or emergency air line 66 with the valve 76.

*Transposition of our mechanism as shown in Fig. 3 to the position of the mechanism shown in Fig. 3a, relative to car 1*

In Figure 3, our braking apparatus is shown with the parts in what we may call the non-operative position, particularly of the brake shoes with respect to the track rails. In Figure 3a there has been a transposition or repositioning of the brake shoes to the position of magnetic contact with the rails. The mode of operation which brings about this transposition of the brake shoes is best indicated by reference to Fig. 3a. There the air controller 109, in which the handle 110 is shown in normal position by full lines at 110, is manipulated by hand to the position shown in dotted lines at 110a. To effect the positioning or application of the brake shoe, and to magnetize it, as the same appears in car designated by the numeral 1, the following manual steps are taken: Resort is had to the air controller 109 in Fig. 3a, and the valve handle 110 is moved from the full-line position to the dotted-line position 110a. The effect of this is to "blank off" or cut out the pipes 111, 112 and 114, to establish air communication between the pipes 113 and 108, whereby air will flow from the supplementary reservoir 83 through the controller 109 and the pipes 108, 107 and 106 to actuate the valve 85 to cause the shoe 57 to be lowered to the rail 58. At the same time air flows from the pipe 108 through the pipe 93 to the switching valve 96, which causes the contact plate 92 to complete or close the energizing circuit 71. Thus the magnetic track brake in car 1 is placed to within the magnetic zone and thence down to and upon the rail. The release of the brake shoe from the rail is effected by returning the handle 110 from the dotted-line position 110a back to the full line position, whereby the pipe lines 108, 113 and 114 are blanked off or cut out and communication is re-established between pipes 111, 112 and the controller 109.

*Operation of the mechanism in Fig. 3a for actuating the mechanism in car 4*

Air flows from 83 through 113, 109, 108 and 107 into 106 by the movement of handle 110 as described for car 1. From the pipe 106 the air will flow into pipe 105, thence through the angle cock 117a and the coupling 118a on the pipe 98. From 98 this air passes into pipe 119a and enters the exhaust valve 102, where the pressure on the underside of the piston 99 will overcome the spring 100 and move the valve 99 up to close the exhaust port 101a. At the same time air will also flow from the pipe line 98 through the pipe 104 and to the pipe 120a whence it will enter the applying valve 85 and lower the shoe 57a to within the magnetic field between the shoe and the rail. Air also flows from the pipe 120a through the pipe 93 to the switch valve 96 which causes the contact plate 92 to complete the energizing circuit, as previously described, whereby the brake shoe 57a is magnetized and under that influence also is caused to come down upon the rail with great pressure. To release this brake shoe from the rail the handle 110 of the air controller 109 is returned from the position indicated at 110a to the normal position indicated at 110.

*Figure 3b and the purpose or function of the main or emergency air line 66 and air controller 66b*

By a manual movement of the controller handle 66d, from the position shown by full lines in Fig. 3b to that shown by dotted lines in Fig. 3b, there will be caused a movement of the valves 76 in the cars designated by the numerals 1 and 4, which will result in lowering and energizing the rail brakes 57 and 57a. When it is desired to apply the brakes 57 and 57a, the first step is to manually manipulate the handle 66d from the normal position shown in full lines to the adjusted position shown in dotted lines at 66e; these positions being shown in Fig. 3b.

This first step having been performed, which moves the valve 66b so as to partially or wholly establish communication between train line 66 and exhaust pipe 66c, thus allowing a part or all of the air, normally supplied to 66, to exhaust to atmosphere and reduce the pressure in 66.

In car 1 the reduction of air pressure in 66 is communicated through pipe 116a to the chamber below 76, so that the spring 78, plus the air pressure above 76 as communicated by 82 from 83, presses 76 downward to the position shown where it closes the entry of pipe 112 and establishes communication between pipe 82 and pipe 106. Thereby air flows from 83 through pipe 82, chamber above 76, and pipe 106 to the valve 85 where it acts on the piston 86 to cause the rail brake shoe 57 to be moved downward from the position shown in Figure 3 to that shown in Figure 3b, the latter with the brake in magnetic contact with the rail.

A part of the air passing down pipe 82 has diverted into pipe 107 and pipe 93 and entered the valve 96 and pressed on the piston 94 to cause the contact 92 to engage with the terminals 92a and 92b, to close the energizing circuit comprised of the lines 71 and 72 which get their current from storage battery 89. Thus the brake shoe 57 was energized. All of these operations have taken place in car 1.

Now as to car 4 in Fig. 3b and its mechanism, the same operations as above described as to the mechanism in car 1 have taken place. For instance, when the handle 66d, and thereby its associated valve 66b, was manipulated to partially or wholly exhaust the compressed air from 66 through 66b and 66c to atmosphere, then the resulting reduction in pressure in 66 of car 1 is communicated through angle cocks 117a and coupling house 118a to 66 on car 4.

Continuing as to car 4 in Fig. 3b and its mechanism, the said reduction in pressure in 66 is communicated by pipe 116a to the chamber below piston 76 of valve 77, whereupon the spring 78 plus the air pressure above 76 presses 76 downward to the position shown, where 76 closes the entry of pipe 103 and establishes communication between pipe 82 and 120a. Thereby air flows from 83 through pipe 82, chamber above 76 and pipe 120a to valve 85 where it acts on piston 86 to cause the rail brake shoe 57a to be moved downward from the position shown in Figure 3 to that shown in Figure 3b, the latter with the brake in magnetic contact with the rail 58. At the same time the air in 120a enters the pipe 93 and passes on into valve 96, actuating the valve proper 94. This causes the switch plate 92 to contact with its terminals 92a and 92b, to close the energizing circuit formed of the wires 71 and 72, these wires receiving current from the storage battery 89; the hand switches 90 and 91 having been manually closed preparatory to these operations.

It will be seen, that, while only one means of controlling the pressure in 66 has been described, by manually manipulating handle 66d, and thereby valve 66b, yet any valve suitably connected to 66 and suitably operable may effect the same result, for instance the valve 74 is shown in Fig. 3b in a position to exhaust the air from 66, having been moved to that position by an engagement with the train control trip 75 actuated by any suitable means externally disposed of the car 1.

Referring to Figure 4, it will be noted that there is a single air line having an emergency relief, as heretofore described, through the lever 74 and trip 75. The air line 66 is provided with a manual controller 66b having an air supply line 66a and an exhaust 66c. There is an independent current source on each car and these current sources are interconnected into a common electrical control system carried on one of the cars. The electrical controller is generally designated 115. The controller is provided with contact plates 116 and 117 adapted to bridge the contacts 118 and 119 in one pair and 120 and 121 in the other pair. Contact 118 is connected by the wire 122 to one side of the electrical source, and contact 120 is connected by the wire 123 to the other side. Contact 119 is connected by the wire 124 to the main cable line that communicates with each vehicle system designated 125 while the contact 121 is connected by the wire 126 to the other cable line 127. The line 124 has connected into it the line 128, solenoid coil 129, which is connected by the line 130 to the line 126. This solenoid coil 129 has a core 131 connected to the piston rod 132 of the control valve 133. The piston rod 132 is connected to a piston 134 resisted in its movement by the spring 135. The exhaust pipe 112 exhausts from the top of this valve, thence out through the vent 136. The piston 134 carries a depending valve member 137 which controls the passage of air between the pipe 108 and pipe 138 connected to the tank 83.

When the controller 115 is moved to closed position, the solenoid coil 129 is energized so that the valve member 137 is elevated and the air from the tank 83 enters the line 108, applies the rail brake and closes the electrical circuit. Upon opening the controller and deenergizing the brake, the piston 134 is lowered so as to permit the exhaust of air from the pipe 84 and pipe 93 through the passageway 76a in the valve member 76 through the pipe 112 and thence out through the exhaust 136.

This invention covers the emergency application of track brakes by the failure of the emergency air using an auxiliary air system to apply and cause the energizing of the brakes by connecting them to an electrical energy.

It also covers the use of a common electrical system for electrically controlling the application of auxiliary air and the energization of the brakes electrically. It comprises also, in association with the last statement, the use of an auxiliary air pressure system for applying the brakes simultaneously by a common air system and simultaneously or successively closing electrical connections of the rail brakes to the electrical supply.

It also covers the use of a common electrical system having a common electrical controller for controlling the application of the auxiliary air for applying the brakes and connecting them to their electrical energization sources. It also covers independent electrical energization sources for the rail brakes on each vehicle in addition to the common electrical energy for all vehicles used for controlling the application of the auxiliary air. It also comprehends in this combination the use of an auxiliary air system which, when opened automatically, applies the brakes irrespective of the main electrical system, and energizes the brakes.

It further covers the use of independent auxiliary air applying systems on each vehicle, an electrical supply system on one vehicle connected to the brakes of all vehicles and closed upon the application of auxiliary air and an emergency air system common to all vehicles, the opening of which will apply the auxiliary air, apply the brakes and energize them, or the manual operation of which on one of the vehicles will do the same thing.

It also covers the use of an arrangement where there is an emergency air system, a straight air system common to all vehicles, auxiliary air systems on each vehicle operated by both straight and emergency air systems, and independent electrical systems operated by the auxiliary air systems mounted on each of the vehicles.

We hereby reserve for purposes of a divisional and continuing application, certain subject matter which has been cancelled from this parent case, which subject matter is to be made, with other features to be added thereto, the subject matter for such divisional and continuing application. In substance such reserved subject matter comprises a system and mechanism involving an electric generator with appropriate switches including cooperating solenoids, and adapted to be located in a railway car or duplicated in each car contained in a train; together with mechanism located in a motorman's car or at a motorman's station, such mechanism comprising a controller and electric circuits connected with said generator, and further comprising air means controlled by said circuit and controller, and adapted to receive air pressure, whereby such air means control and utilize such air pressure in effecting the positioning of a rail brake with reference to the rail; and such electric circuit functioning also to energize said rail brake.

It will be understood that we desire to comprehend within our invention such modifications as may be necessary to adapt it to varying conditions and uses.

Having thus fully described our invention, what we claim as new and desire to secure by Letters Patent, is:

1. In a rail brake system, an emergency air line, the reduction in pressure in which brings about an emergency application of brakes, a rail brake, electrical means of energizing the rail brake, auxiliary air means of applying the rail brake and of closing the electrical means for energizing the rail brake, and means for bringing said auxiliary air system and electrical means into operation upon a decrease in pressure in the emergency braking system.

2. In a rail brake system for a train, a plurality of train vehicles, rail brakes associated with each vehicle, a common electrical supply system for all of said vehicles for energizing each of said brakes, a common electrical control for the application of each of said brakes on each of said vehicles, and an air means so controlled for applying the brakes of each of said systems.

3. In an electrical brake system, a plurality of vehicles connected together comprising a train, rail brakes on each of said vehicles, a common electrical supply system adapted to energize each of said brakes, a common control therefor, pneumatic means so controlled adapted to apply said brakes and close the electrical circuits for the energization of said brakes.

4. In an electrical brake system, a plurality of vehicles connected together comprising a train, rail brakes on each of said vehicles, a common electrical supply system adapted to energize each of said brakes, a common control therefor, pneumatic means so controlled adapted to apply said brakes and close the electrical circuits for the energization of said brakes, and independent electrical supply systems on each of said vehicles for the magnetic brakes thereon.

5. In an electrical brake system, a plurality of vehicles connected together comprising a train, rail brakes on each of said vehicles, a common electrical supply system adapted to energize each of said brakes, a common control therefor, pneumatic means so controlled adapted to apply said brakes and close the electrical circuits for the energization of said brakes, independent electrical supply systems on each of said vehicles for the magnetic brakes thereon, and independent air systems on each of said vehicles for applying the magnetic brakes thereon.

6. In an electrical rail brake system, a plurality of vehicles connected sequentially together comprising a train, locomotive rail brakes on each of said vehicles, a common electrical supply system adapted to energize each of said brakes, a common control therefor, pneumatic means so controlled adapted to apply said brakes and close the electrical circuits for the energization of said brakes, independent electrical supply systems on each of said vehicles for the magnetic brakes thereon, independent air systems on each of said vehicles for applying the magnetic brakes thereon, and an emergency air system common to all of said vehicles, upon the actuation of which the brakes of all of the vehicles will be applied and energized.

7. In a train brake system, a plurality of vehicles, interconnected rail brakes on each vehicle, a common source of electrical energy delivered to each vehicle, an electrical controller connected thereto, electrically-actuated means for controlling the air application of the rail brakes on each vehicle, rail brake means also so controlled by the air application of said brakes for connecting the brakes to sources of electrical energy on each of the vehicles for their energization, an air system common to all of said vehicles for emergency purposes, upon the emergency operation of which, irrespective of the closing of the electrical controller, said rail brakes will be applied and energized.

8. In a train brake system, a plurality of vehicles, interconnected rail brakes on each vehicle, a common source of electrical energy delivered to each vehicle, an electrical controller connected thereto, electrically-actuated means for controlling the air application of the rail brakes on each vehicle, rail brake means also so controlled by the air application of said brakes for connecting the brakes to sources of electrical energy on each of the vehicles for their energization, an air system common to all of said vehicles for emergency purposes, upon the emergency operation of which, irrespective of the closing of the electrical controller, said rail brakes will be applied and energized, and manual means for controlling the last mentioned air means at will irrespective of the closing of the electrical controller or emergency application.

9. In a brake system, a plurality of vehicles connected together comprising a train, rail brakes on each of said vehicles, a common electrical supply system for energizing the brakes, independent pneumatic supply systems on each vehicle for applying the brakes, one of said vehicles having means for closing the electrical system when the brakes are applied for energizing the brakes, and a common air system for controlling in an emergency or otherwise the application and energization of said brakes.

10. In a rail brake system, a plurality of vehicles connected together, rail brakes on each vehicle, a common emergency air line on each vehicle, a common straight air line on each vehicle, means by which either of said air lines can apply said rail brakes and close the energization means therefor, and electrical energy means for said brakes.

11. In a rail brake system, a plurality of vehicles connected together, rail brakes on each vehicle, a common emergency air line on each vehicle, a common straight air line on each vehicle, means by which either of said air lines can apply said rail brakes and close the energization means therefor, electrical energy means for said brakes, and manual means for controlling the application of the straight air line for applying and energizing said brakes.

12. In a rail brake system, a plurality of vehicles connected together, rail brakes on each vehicle, a common emergency air line on each vehicle, a common straight air line on each vehicle, means by which either of said air lines can apply said rail brakes and close the energization means therefor, electrical energy means for said brakes, manual means for controlling the application of the straight air line for applying and energizing said brakes, means remote from the vehicles for operating the emergency air system for applying and energizing said air brakes, means on one of said vehicles for applying the emergency air line for energizing and actuating all of the brakes on all of the vehicles, and means for the supplying of electrical energy to each of said vehicles mounted on its respective vehicle.

13. In a rail brake system, a train comprising a plurality of vehicles connected together, rail brakes on each of said vehicles, independent electrical means for energizing the brakes mounted on each of the vehicles, a common straight air means and an emergency air means on all of said vehicles, an auxiliary air supply means controlled either by the straight air or the auxiliary air means for applying and energizing said rail brakes.

14. In a rail brake system, a train comprising a plurality of vehicles connected together, rail brakes on each of said vehicles, independent electrical means for energizing the brakes mounted on each of the vehicles, a common straight air means and an emergency air means on all of said vehicles, an auxiliary air supply means controlled either by the straight air or the auxiliary air means for applying and energizing said rail brakes, and manual control means on one of said vehicles for controlling the application of the emergency and straight air means on any or all of said vehicles.

15. In a magnetic rail brake system associated with a plurality of car units, one or more of said ear units being provided with a complete electrical power system for the traction system and complementary electrical service systems, a plurality of said car units connected sequentially together comprising a train, magnetic rail brakes mounted on each of said car units, a complementary electrical system common to said car units adapted to control the application and energization of the said magnetic rail brakes and to release them, a common control therefor, and a supply of compressed air so controlled adapted to apply and to close the electrical circuits to energize the said magnetic rail brakes and release them.

THEODORE H. SCHOEPF.
DAVID M. RITCHIE.